(12) United States Patent
Huang et al.

(10) Patent No.: US 7,576,806 B2
(45) Date of Patent: Aug. 18, 2009

(54) THIN FILM TRANSISTOR ARRAY SUBSTRATE WITH PIXEL AREA HAVING A SLIT LOCATED BETWEEN UPPER CAPACITANCE ELECTRODES AND METHOD FOR REPAIRING THE SAME

(75) Inventors: Wei-Kai Huang, Tainan (TW); Yi-Jen Chen, Tainan (TW); Chen-Shun Tsai, Taipei (TW); Chiung-Pin Wang, Changhua (TW)

(73) Assignee: Au Optronics Corporation, Hsinchu (TW)

( * ) Notice: Subject to any disclaimer, the term of this patent is extended or adjusted under 35 U.S.C. 154(b) by 282 days.

(21) Appl. No.: 11/030,701

(22) Filed: Jan. 5, 2005

(65) Prior Publication Data
US 2006/0092341 A1    May 4, 2006

(30) Foreign Application Priority Data
Nov. 2, 2004    (TW) .............................. 93133299 A

(51) Int. Cl.
*G02F 1/1343* (2006.01)
*G02F 1/1337* (2006.01)

(52) U.S. Cl. ........................................ 349/39; 349/129
(58) Field of Classification Search .................. 349/38, 349/129, 39
See application file for complete search history.

(56) References Cited

U.S. PATENT DOCUMENTS

| | | | | |
|---|---|---|---|---|
| 5,337,173 A * | 8/1994 | Atsumi et al. | .................. | 349/39 |
| 6,476,881 B2 * | 11/2002 | Ozaki et al. | .................... | 349/43 |
| 6,628,368 B2 * | 9/2003 | Yang | ........................... | 349/192 |
| 6,650,390 B2 * | 11/2003 | Sakamoto et al. | ........... | 349/143 |
| 6,839,099 B2 * | 1/2005 | Fukunishi | ..................... | 349/54 |
| 6,839,118 B2 * | 1/2005 | Nagaoka | ..................... | 349/143 |
| 6,900,869 B1 * | 5/2005 | Lee et al. | ..................... | 349/129 |
| 6,972,811 B2 * | 12/2005 | Song | ............................ | 349/38 |
| 7,133,086 B2 * | 11/2006 | Toyota et al. | ................. | 349/38 |
| 7,206,048 B2 * | 4/2007 | Song | ........................... | 349/129 |
| 2006/0028592 A1 * | 2/2006 | Lai | .............................. | 349/42 |

* cited by examiner

*Primary Examiner*—David Nelms
*Assistant Examiner*—Nathanael R Briggs
(74) *Attorney, Agent, or Firm*—J.C. Patents

(57) ABSTRACT

A thin film transistor array substrate and method for repairing the same are provided. Each pixel unit of the thin film transistor array substrate has a plurality of upper electrodes, which are coupled to a common line to form a plurality of storage capacitors. If a storage capacitor defects, the portion of the pixel electrode corresponding to the defective storage capacitor is electrically isolated from the other portion of the pixel electrode in the pixel unit. Therefore, the other storage capacitors in the pixel unit can normally display. The thin film transistor array substrate and method for repairing the same provided by the present invention repair the defective storage capacitor in the thin film transistor array substrate and improve the manufacturing yield.

16 Claims, 9 Drawing Sheets

THIN FILM TRANSISTOR ARRAY SUBSTRATE WITH PIXEL AREA HAVING A SLIT LOCATED BETWEEN UPPER CAPACITANCE ELECTRODES AND METHOD FOR REPAIRING THE SAME

CROSS-REFERENCE TO RELATED APPLICATION

This application claims the priority benefit of Taiwan application serial no. 93133299, filed on Nov. 2, 2004.

BACKGROUND OF THE INVENTION

1. Field of the Invention

The present invention relates to an active device array substrate and method for repairing the same, and more particularly to a thin film transistor array substrate and method for repairing the same.

2. Description of the Related Art

A thin film transistor liquid crystal display (TFT LCD) is mainly composed of a thin film transistor array substrate, a color filter array substrate and a liquid crystal layer. Wherein, the thin film transistor array substrate is composed of plural thin film transistors arranged in array and pixel electrodes corresponding to the thin film transistors. The thin film transistors serve as the switch devices of pixel units. In order to control each pixel unit, scan lines and data lines coupled to the thin film transistors are used to select the pixel unit. By applying appropriate operating voltages, data corresponding to the pixel unit is displayed.

The development of LCD is in the trend for requirements of high brightness, high contrast, large screen size and wide view angle. In order to improve the view angle of LCD, several wide view angle techniques have been proposed. The common types of wide view angle LCDs at present are, for example, Multi-Domain Vertical Alignment (MVA) LCD, In-Plane Switching (IPS) LCD, and Fringe Field Switching (FFS) LCD. For MVA LCD, plural slits are formed on a pixel electrode. Plural strip protrusions are disposed over a corresponding color filer array substrate. By incorporation of the slits and protrusions, liquid crystal molecules in the liquid crystal layer will tilt to different directions to achieve the purpose of wide view angle display effect.

Note that in the prior art technology, in order to improve functions of storing and maintaining display data by a pixel unit, a portion of the pixel electrode is generally used to cover over the scan line or the common line to form a storage capacitor (Cst) with a metal-insulator-ITO (MII) structure. In addition, when forming the data line, the source region and the drain region, a upper electrode further is disposed between the pixel electrode and the corresponding common line or scan line. The pixel electrode electrically connects with the upper electrode so that the upper electrode, the common line or the scan line, and a dielectric layer formed between them forms a storage capacitor with a metal-insulator-metal (MIM) structure.

FIG. 1A is a top view of a portion of a prior art thin film transistor array substrate with a MIM storage capacitor. FIG. 1B is a cross sectional view of the structure of FIG. 1A taken along A-A'. Referring to FIGS. 1A and 1B, a portion of a pixel electrode 150 is over a corresponding common line 110. A upper electrode 130 is disposed between the pixel electrode 150 and the corresponding common line 110. In addition, a dielectric layer 120 is disposed between the upper electrode 130 and the corresponding common line 110 to electrically isolate the upper electrode 130 from the corresponding common line 110. Another dielectric layer 140 is disposed between the upper electrode 130 and the corresponding pixel electrode 150. Wherein, the dielectric layer 140 comprises a contact hole 142 so that the upper electrode 130 electrically connects with the pixel electrode 150 through the contact hole 142. Accordingly, the common line 110, the dielectric layer 120 and the upper electrode 130 constitute a MIM storage capacitor 102.

However, the conventional process of fabricating the thin film transistor array substrate may cause the storage capacitor defective due to process defect or other reasons. FIGS. 2A-4A are top views showing various prior art defective MIM storage capacitors. FIGS. 2B-4B are cross sectional views of the structures of FIGS. 2A-4A taken along A-A'.

Referring to FIGS. 2A and 2B, a defect 122 exists in the dielectric layer 120 between the common line 110 and the upper electrode 130. The defect 122 may be a particle or a hole resulted from process contamination, for example. Charge leakage between the upper electrode 130 and the common line 110 will occur because of the defect 122. In FIG. 3A (please redraw 170 for enhancing material residue) and 3B, in the prior art method of fabricating a data line 160 and the upper electrode 130, a conductive material 170 such as aluminum, may be remained between the data line 160 and the upper electrode 130, and the pixel electrode 150 may be electrically shorted to the data line 160 via the upper electrode 130.

In FIGS. 4A and 4B, in the prior art method of fabricating the pixel electrode 150, a conductive material 180 such as indium-tin-oxide (ITO) may be remained between two neighboring pixel electrodes that the adjacent pixel electrodes 150 are electrically shorted to each other. Regardless which situation described above occurs, the pixel unit will not normally display and as a result the displaying quality of the LCD becomes worse.

SUMMARY OF THE INVENTION

Accordingly, the present invention is directed to a thin film transistor array substrate to reduce the problem that pixel units do not normally operate due to process defects; and hence manufacturing yields are improved.

In addition, the present invention provides a method for repairing a thin film transistor array substrate having defective capacitors as to improve the manufacturing yields of the thin film transistor array substrate.

According to the objects described above or other objects, the present invention provides a thin film transistor array substrate comprises a substrate, a plurality of scan lines, a plurality of data lines, a plurality of common lines and a plurality of pixel units which are disposed over the substrate. Wherein, the data lines and the scan lines form a plurality of pixel areas on the substrate. A portion of each common line is disposed in one of the pixel areas. Each of the pixel units is disposed in one of the pixel areas and driven by one of the scan lines and one of the data lines corresponding thereto. Each of the pixel units comprises a thin film transistor, a patterned pixel electrode, and a plurality of upper electrodes. Wherein, the thin film transistor is coupled to the scan line and the data line corresponding thereto. The patterned pixel electrode is disposed over the common line corresponding thereto, and coupled to the thin film transistor. The pixel electrode comprises at least one slit. In addition, the upper electrodes are disposed between the pixel electrode and the common line corresponding thereto, wherein the upper electrode is coupled to the pixel electrode and forms a plurality of capacitors with the common line corresponding thereto.

According to a thin film transistor array of a preferred embodiment of the present invention, the edge of each of the slits has a jag profile.

The present invention further provides a method for repairing a thin film transistor array substrate, which is adapted for repairing the thin film transistor array described above. Wherein, the thin film transistor array comprises a defective capacitor. The method removes the portion of the pixel electrode corresponding to the defective capacitor so that the portion of the pixel electrode corresponding to the defective capacitor is electrically isolated from other portion of the pixel electrode. After isolating defective portion of pixel electrode, other portion of pixel electrode can operate normally.

According to the repairing method for the thin film transistor array of a preferred embodiment of the present invention, the portion of the pixel electrode can be removed by laser.

The present invention further provides a thin film transistor array substrate comprising a substrate, a plurality of scan lines, a plurality data lines, a plurality of common lines and a plurality of pixel units that are disposed over the substrate. Wherein, the data lines and the scan lines form a plurality of pixel areas on the substrate. A portion of each common line is disposed in one of the pixel areas. Each of the pixel units is disposed in one of the pixel areas and driven by one of the scan lines and one of the data lines corresponding thereto. Each of the pixel units comprises a thin film transistor, a patterned pixel electrode, and a plurality of upper electrodes. Wherein, the thin film transistor is coupled to the scan line and the data line corresponding thereto. The patterned pixel electrode is disposed over the common line corresponding thereto and coupled to the thin film transistor. The pixel electrode comprises at least one slit. In addition, the upper electrodes are disposed between the pixel electrode and the common line corresponding thereto, wherein the upper electrode is coupled to the pixel electrode, and forms a plurality of capacitors with the common line corresponding thereto. In addition, at least one of the capacitors described above is defective, and a portion of the pixel electrode corresponding to the defective capacitor is electrically isolated from other portion of the pixel electrode.

According to a thin film transistor array of a preferred embodiment of the present invention, a particle and/or a hole exists between the upper electrode of the defective capacitor and the common line corresponding thereto.

According to a thin film transistor array of a preferred embodiment of the present invention, a particle and/or a hole exists between the pixel electrode of the defective capacitor and the common line corresponding thereto.

According to a thin film transistor array of a preferred embodiment of the present invention, the structure further comprises, for example, a conductive residue coupled between the upper electrode of the defective capacitor and one of neighboring data lines. In addition, the upper electrode, the data lines and the conductive residue may have the same material. The material can be aluminum.

According to a thin film transistor array of a preferred embodiment of the present invention, the structure further comprises, for example, a conductive residue coupled between the pixel electrode and one of neighboring pixel electrodes. The material of the conductive residue comprises, for example, indium-tin-oxide (ITO).

According to a thin film transistor array of a preferred embodiment of the present invention, the edges of each slit may have a jag profile.

Accordingly, each pixel unit of the thin film transistor array substrate comprises plural upper electrodes to form plural capacitors. Wherein, if one of the capacitors is a defective capacitor, the present invention electrically isolates the portion of the pixel electrode corresponding to the defective capacitor from other portion of the pixel electrode. By the electrical isolation, other capacitors in the pixel unit can normally operate so that the pixel unit can normally display. Accordingly, by using the thin film transistor array substrate and the repairing method thereof according to the present invention, the issue that the pixel unit cannot normally display due to manufacturing defects can be effectively improved. The manufacturing yields are also improved.

The above and other features of the present invention will be better understood from the following detailed description of the preferred embodiments of the invention that is provided in communication with the accompanying drawings.

BRIEF DESCRIPTION OF THE DRAWINGS

FIGS. 2A-4A are top views showing various prior art defective MIM storage capacitors.

FIGS. 2B-4B are cross sectional views of the structures of FIGS. 2A-4A taken along A-A'.

DESCRIPTION OF SOME EMBODIMENTS

Figure 1A:
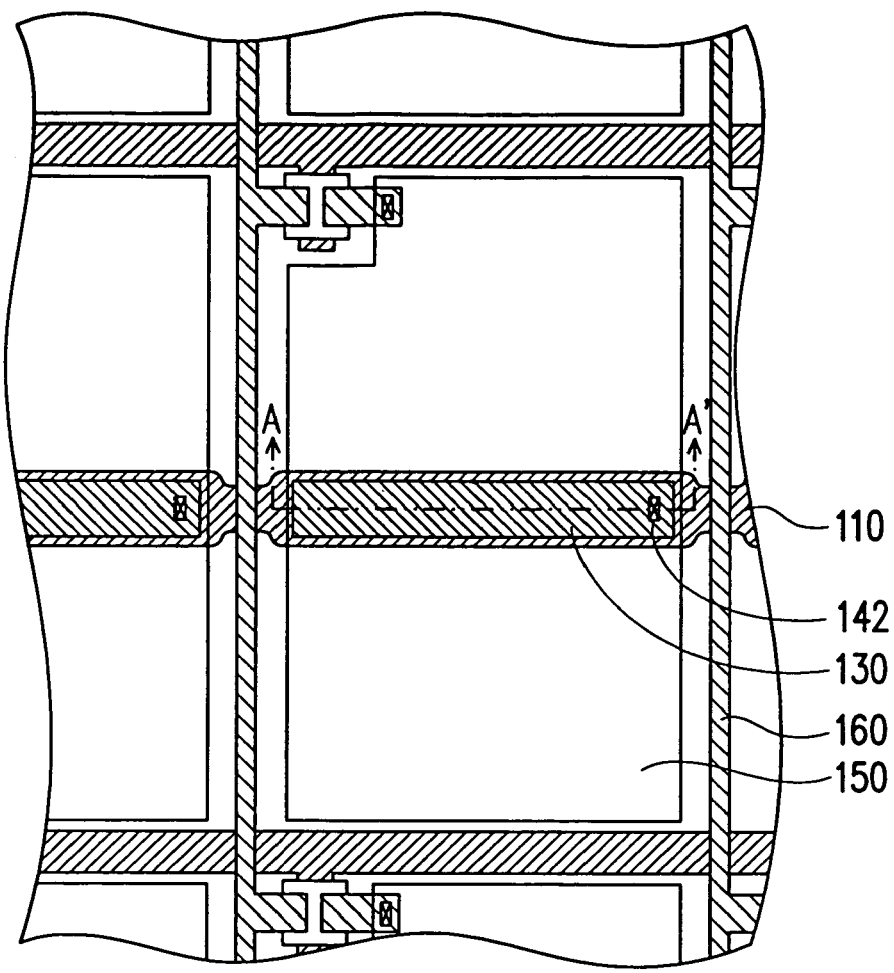
FIG. 1A is a top view of a portion of a prior art thin film transistor array substrate with an MIM storage capacitor.
Figure 1B:
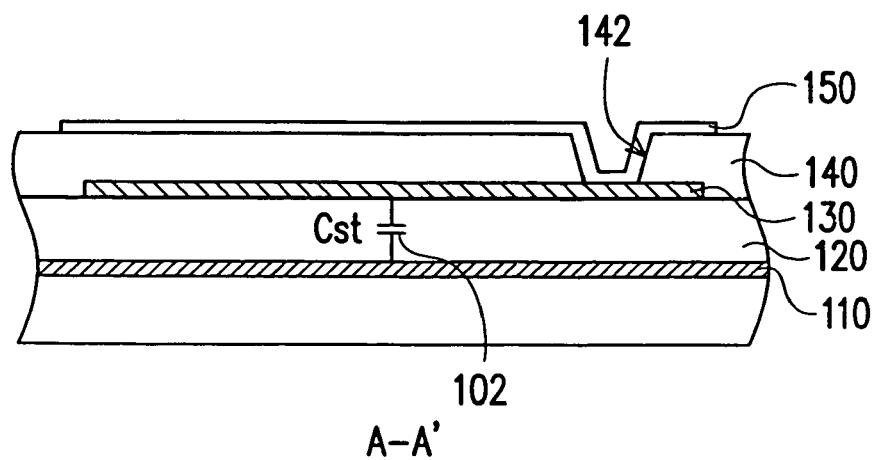
FIG. 1B is a cross sectional view of the structure of FIG. 1A taken along A-A'.
Figure 2A:
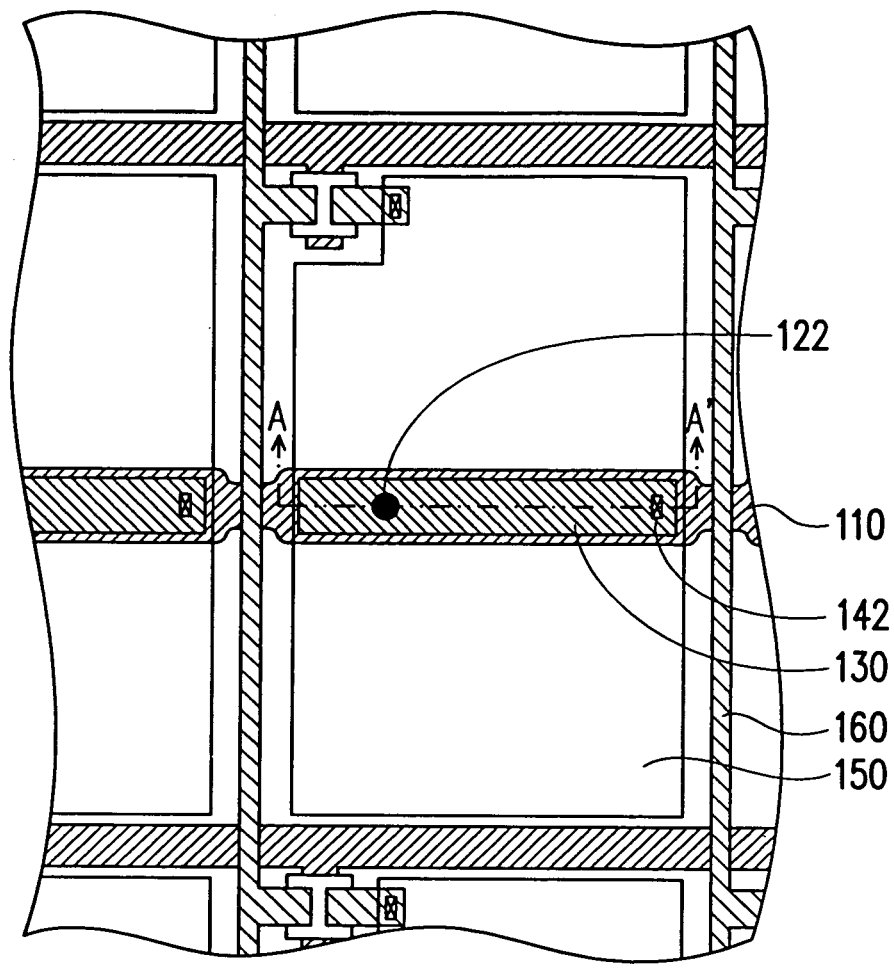
Figure 2B:
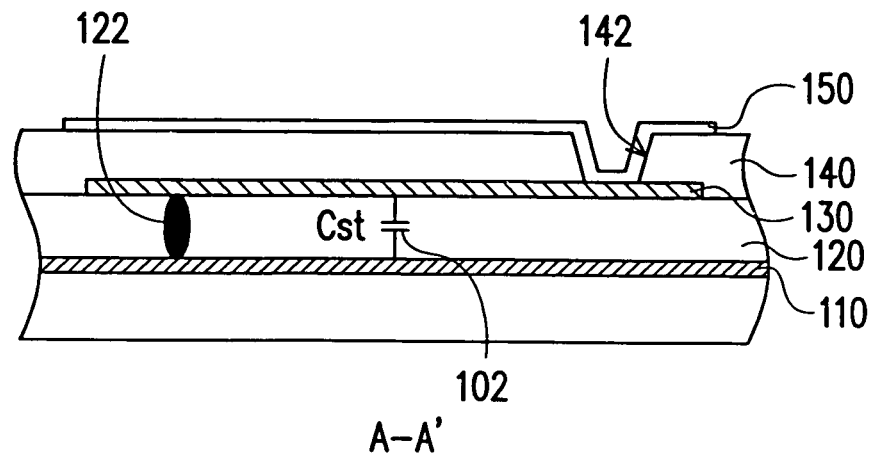
Figure 3A:
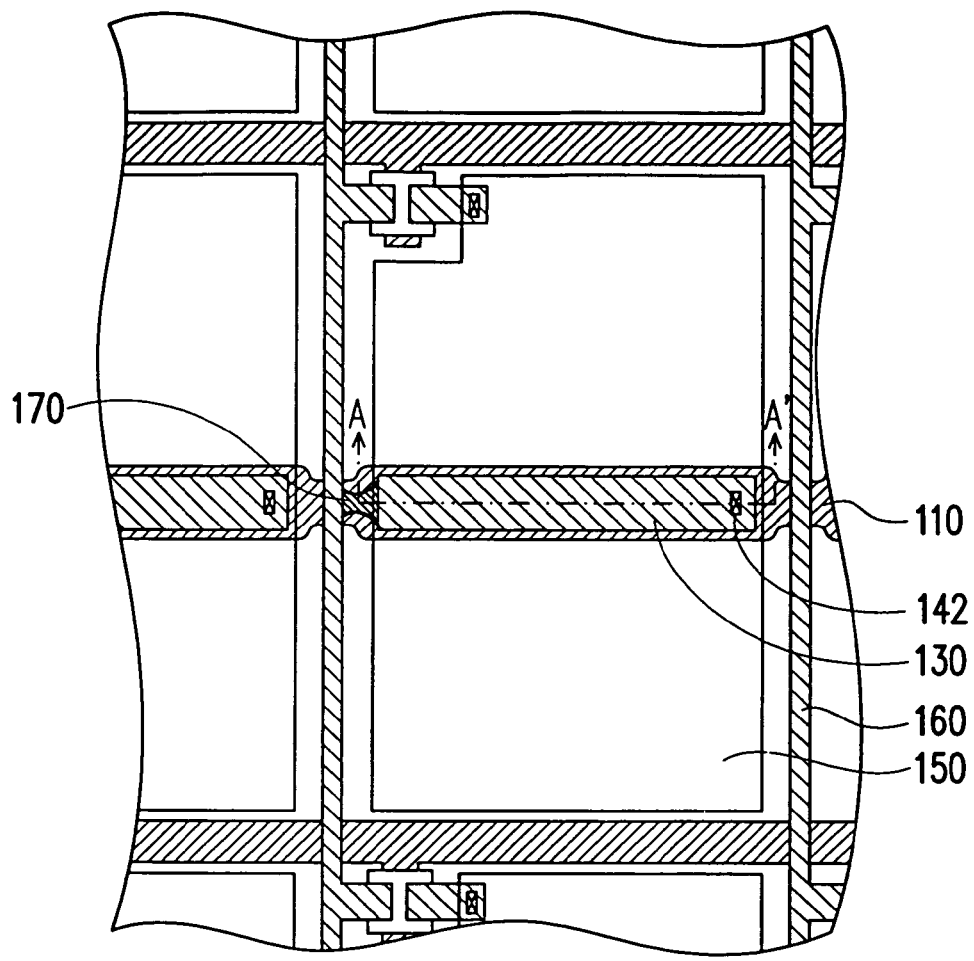
Figure 3B:
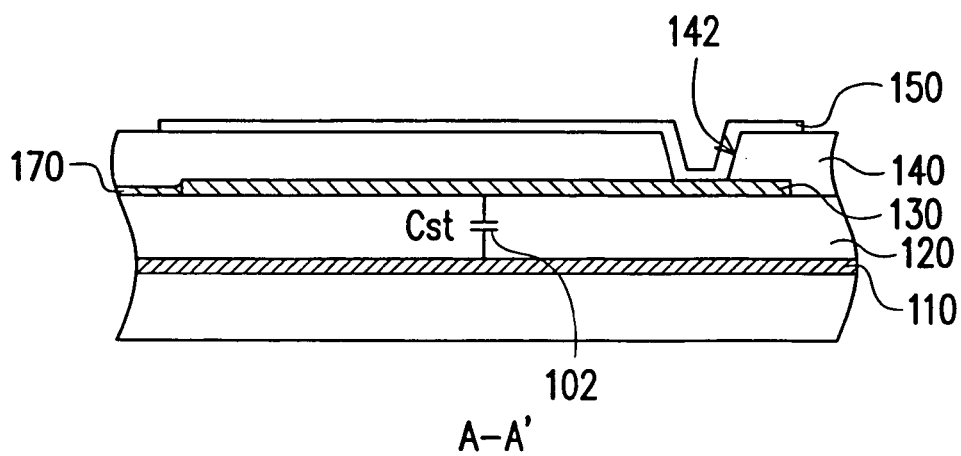
Figure 4A:
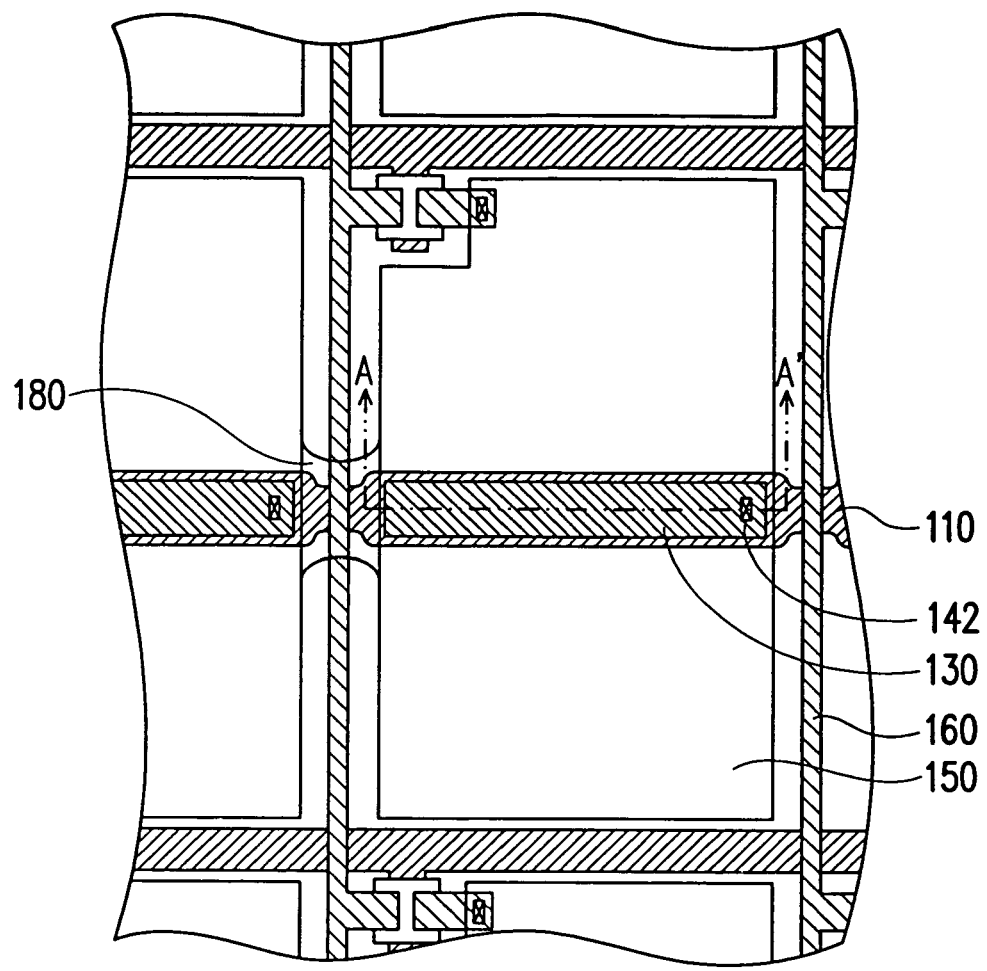
Figure 4B:
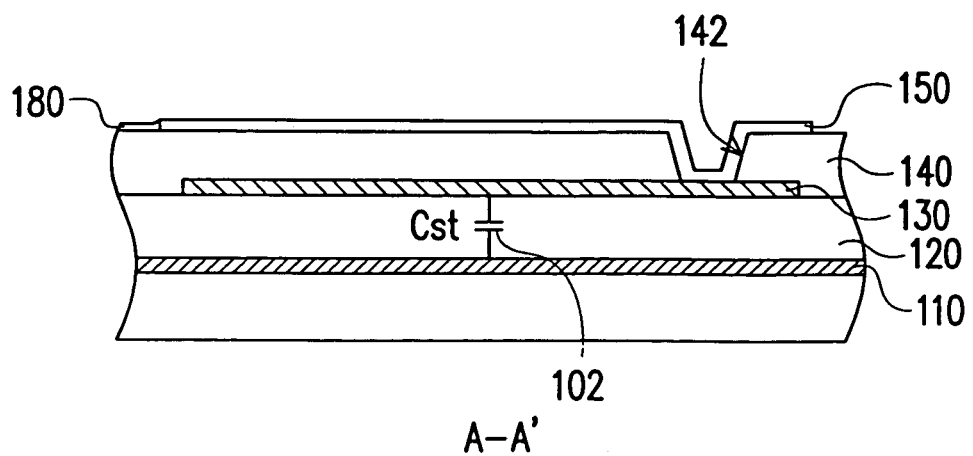
Figure 5A:
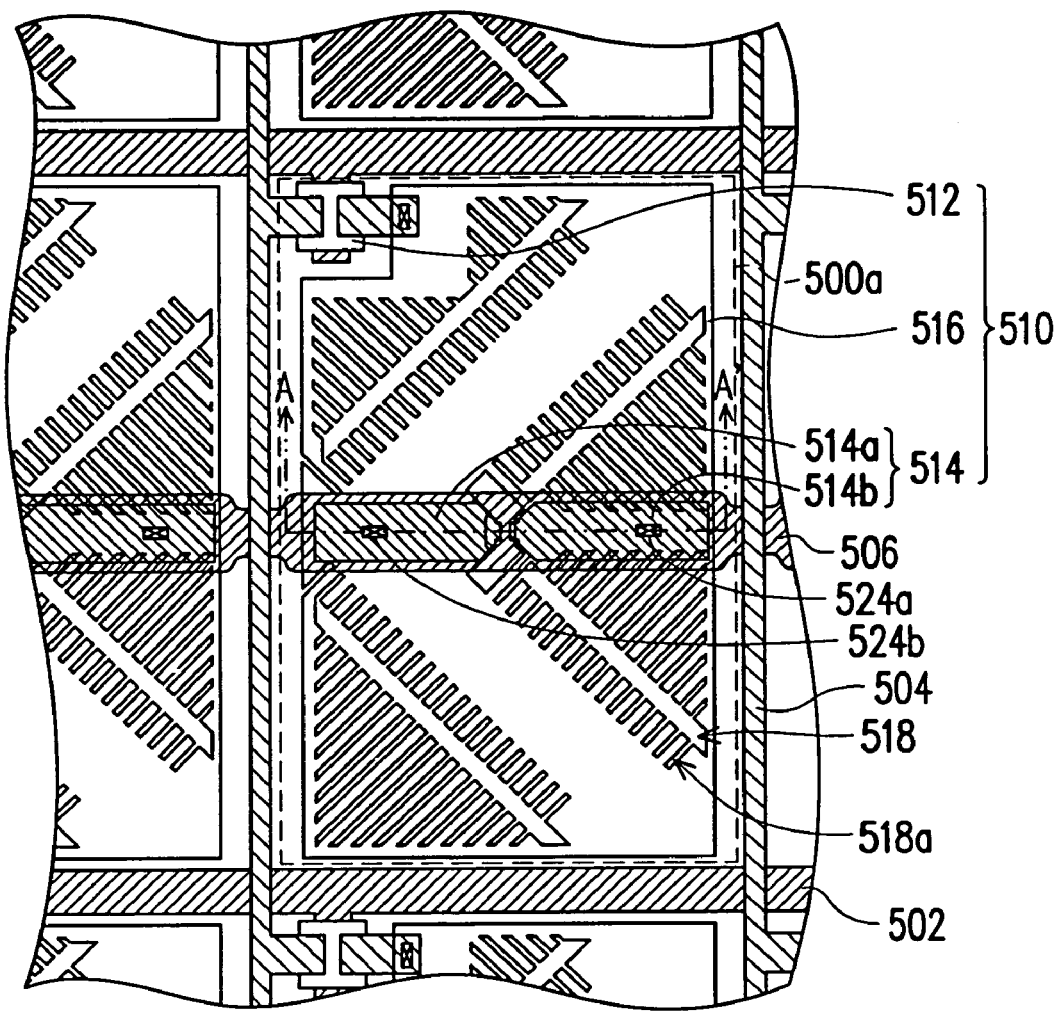
FIG. 5A is a top view of a portion of a Multi-Domain Vertical Alignment (MVA) thin film transistor array substrate according to an embodiment of the present invention.
Figure 5B:
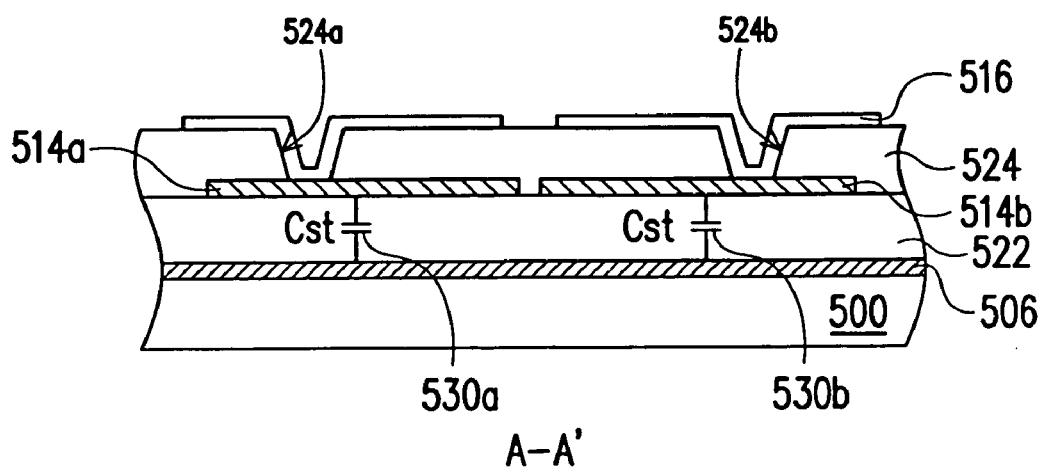
FIG. 5B is a cross sectional view of the structure of FIG. 5A taken along A-A'.

FIG. 5A is a top view of a portion of a Multi-Domain Vertical Alignment (MVA) thin film transistor array substrate according to an embodiment of the present invention. FIG. 5B is a cross sectional view of the structure of FIG. 5A taken along A-A'. Referring to FIGS. 5A and 5B, a substrate 500 can be, for example, a glass substrate. Plural scan lines 502 and plural data lines 504 are disposed over the substrate 500 to form plural pixel areas 500a on the substrate 500. In addition, plural common lines 506 are disposed over the substrate 500. The common lines 506 can be formed with the scan lines 502 in the same process, for example. The material of the common lines 506 can be, for example, chromium (Cr), aluminum (Al), or other metal with good electrical conductivity. Each common line 506 is disposed in the corresponding pixel areas 500a.

Referring to FIGS. 5A and 5B, plural pixel units 510 are disposed in one of the pixel areas 500a respectively. Each pixel unit 510 comprises a thin film transistor 512, plural upper electrodes 514 and a patterned pixel electrode 516, wherein the thin film transistor 512 is coupled to the corresponding scan line 502 and the corresponding data line 504 and driven by the corresponding scan line 502 and the corresponding data line 504. In addition, each upper electrode 514 comprises, for example, a first upper electrode 514a and a second upper electrode 514b, which are disposed over the common line 506. The upper electrodes 514 can be formed with the data lines 504 in the same process, for example. The material of the upper electrodes 514 can be, for example, chromium (Cr), aluminum (Al), or other metal with good conductivity. In addition, a dielectric layer 522 is disposed between the upper electrodes 514 and the common lines 506. The material of the dielectric layer 522 can be silicon nitride (SiNx), for example.

Referring to FIGS. 5A and 5B, pixel electrodes 516 are disposed over the upper electrodes 514 respectively, wherein each pixel electrode 516 comprises plural slits 518, for example. The edge in two sides of each slit 518 comprises plural extrusions sub-slits 518a and has a jag profile. Wherein, the material of the pixel electrodes 516 can be, for example, indium-tin-oxide (ITO) or other transparent conductive materials. With the slits 518, electrical fields applied to liquid crystal molecules (not shown) over the pixel electrodes 516 can be changed to provide multi-domain vertical alignment and to reach the purpose of wide viewing angle display. In addition, a dielectric layer 524 is formed between the pixel electrodes 516 and the upper electrodes 514, for example. Each first upper electrode 514a and each second upper electrode 514b are electrically contacted to the corresponding pixel electrode 516 through contact holes 524a and 524b respectively to form a first capacitor 530a and a second capacitor 530b, which have a metal-insulator-metal (MIM) structure.

In the thin film transistor array substrate described above, each pixel electrode 510 has a first capacitor 530a and a second capacitor 530b. Wherein, when the first capacitor 530a has defects, after repaired, the second capacitor 530b can normally operate. Following are descriptions with respect to situations that cause the defects of capacitors of the thin film transistor array substrate and the repairing method for the defective capacitors.

Figure 6A:
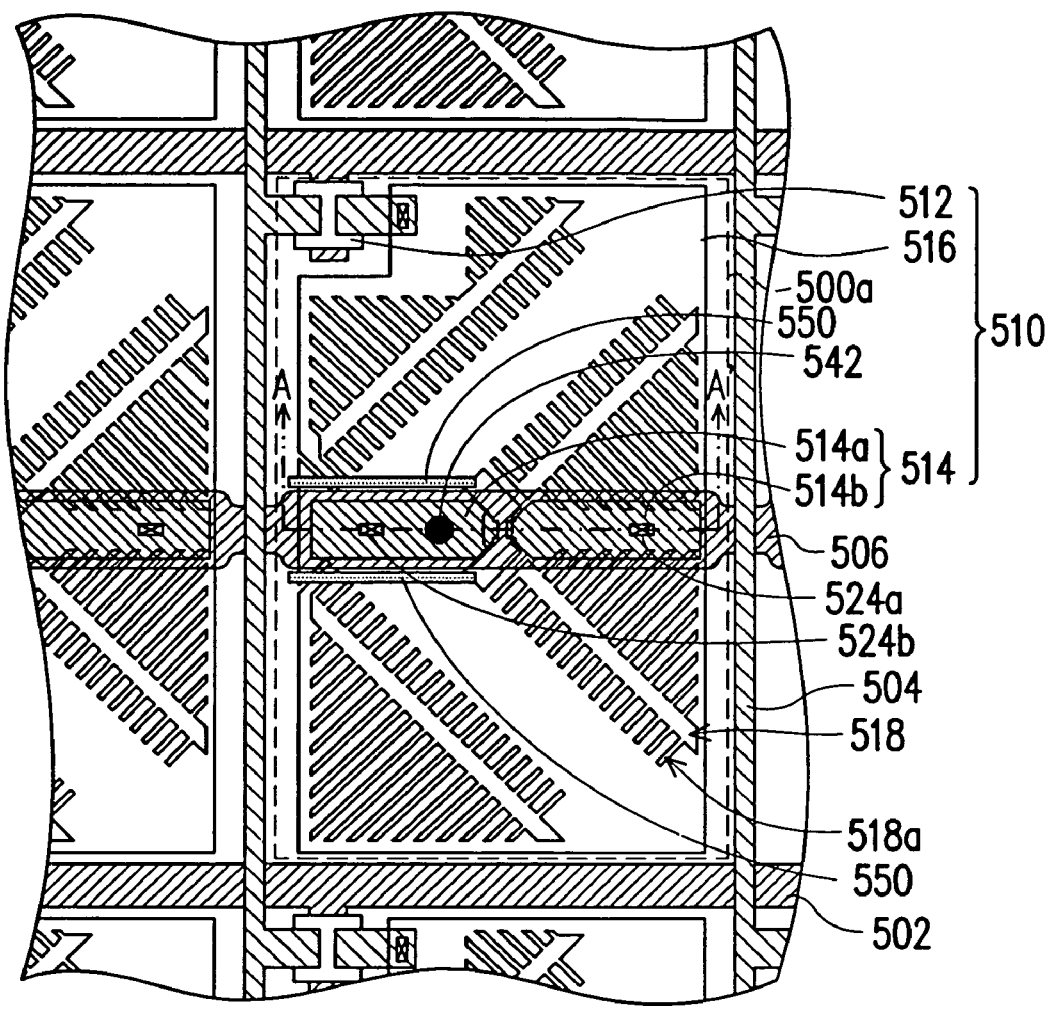
FIG. 6A is a top view of defective capacitor caused by the short between upper electrode and common line and show how to repair.
Figure 6B:
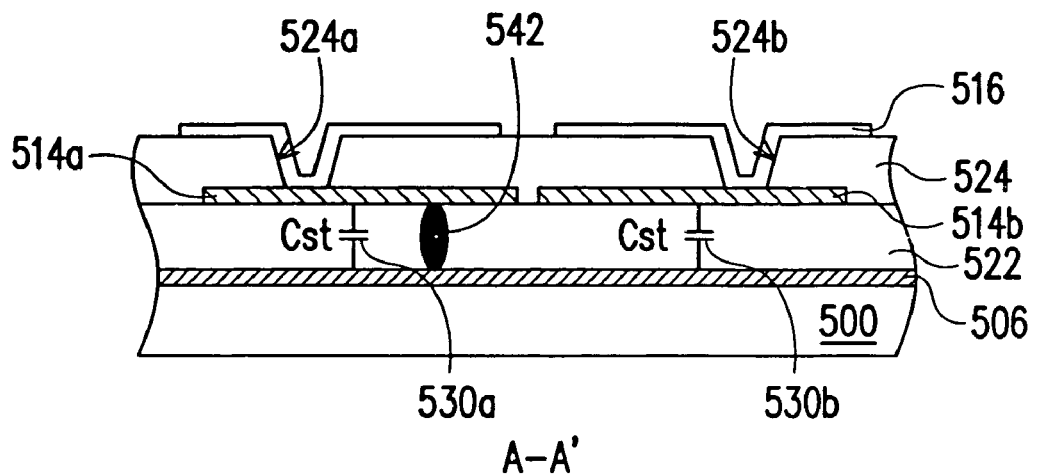
FIG. 6B is a cross sectional view of the structure of FIG. 6A taken along A-A'.

FIG. 6A is a top view of a portion of a thin film transistor array substrate with a defective capacitor. FIG. 6B is a cross sectional view of the structure of FIG. 6A taken along A-A'. Referring to FIGS. 6A and 6B, a defect 542 exists in the dielectric layer 522 between one of the first upper electrode 514a and the corresponding common line 506. Wherein, the defect 542 is a particle or a hole generated from by-process contamination. The defect 542 results in short or charge leakage of the first capacitor 530a formed by the upper electrode 514a and the corresponding common line 506, and causes defect of the first capacitor 530a. The first capacitor 530a becomes a defective capacitor. Because the second capacitor 530b shares the same pixel electrode 516 with the first capacitor 530a, the second capacitor 530b also fails.

Referring to FIGS. 6A and 6B, in order to avoid the defect of the capacitors in the pixel unit 510, a repairing method is proposed. The repairing method removes a portion of the pixel electrode, such as the removed area 550, by laser, for example. The removed area 550 is at the peripheral area of the first capacitor 530a, and extends from the edge of the pixel electrode 516, which is on the left side of the first upper electrode 514a, to a slit 518, which is on the right side of the first upper electrode 514a. Wherein, by incorporation of the slit 518 over the pixel electrode 516 and the removed area 550, the portion of the pixel electrode 516 corresponding to the first capacitor 530a is electrically isolated from the other portion of the pixel electrode 516. Accordingly, even if the first capacitor 530a defects, the second capacitor 530b and the other portion of the pixel electrode 516 will not be affected by the defect 542, and can normally operate.

Figure 7A:
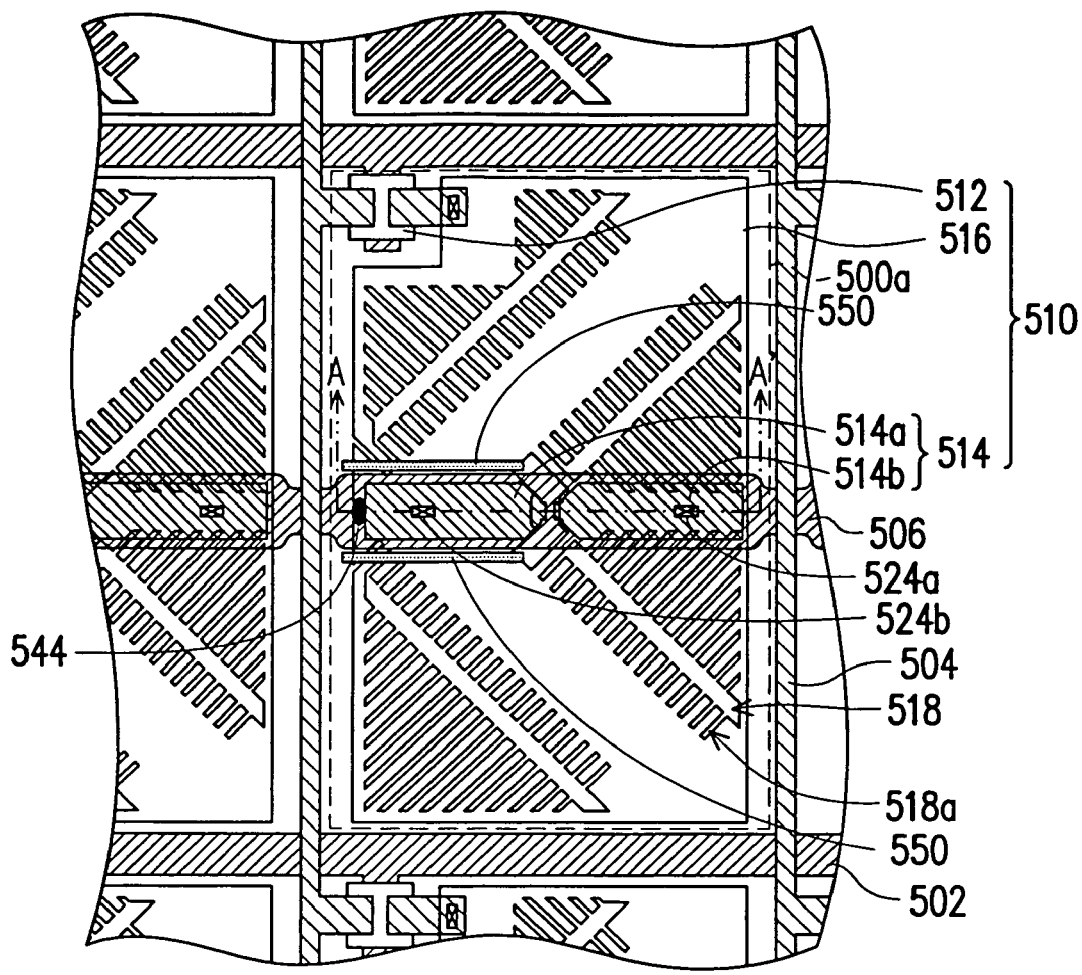
FIG. 7A is a top view of defective capacitor caused by the short between pixel electrode and common line and show how to repair.
Figure 7B:
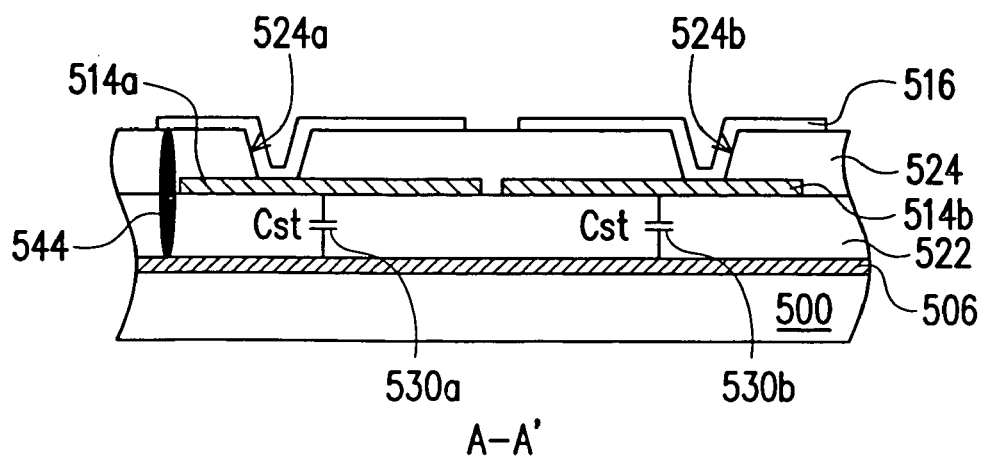
FIG. 7B is a cross sectional view of the structure of FIG. 7A taken along A-A'.

FIG. 7A is a top view of a portion of another thin film transistor array substrate with a defective capacitor. FIG. 7B is a cross sectional view of the structure of FIG. 7A taken along A-A'. Referring to FIGS. 7A and 7B, a defect 544, which is adjacent to one of the first capacitor 530a, exists between the pixel electrode 516 and the corresponding common line 506, and in the dielectric layer 522 and/or the dielectric layer 524. Wherein, the defect 544 is a particle or a hole caused by process contamination. The defect 544 results in short or charge leakage of the first capacitor 530a between the pixel electrode 516 and the corresponding common line 506 and causes defect of the first capacitor 530a and the second capacitor 530b.

Referring to FIGS. 7A and 7B, similar to the embodiment shown in FIG. 6A, the repairing method defines the removed area 550 at the peripheral area of the first capacitor 530a. By using the slit 518 over the pixel electrode 516 and the removed area 550, the portion of the pixel electrode 516 corresponding to the first capacitor 530a is electrically isolated from the other portion of the pixel electrode 516. Accordingly, the second capacitor 530b and the other portion of the pixel electrode 516 can normally operate.

Figure 8A:
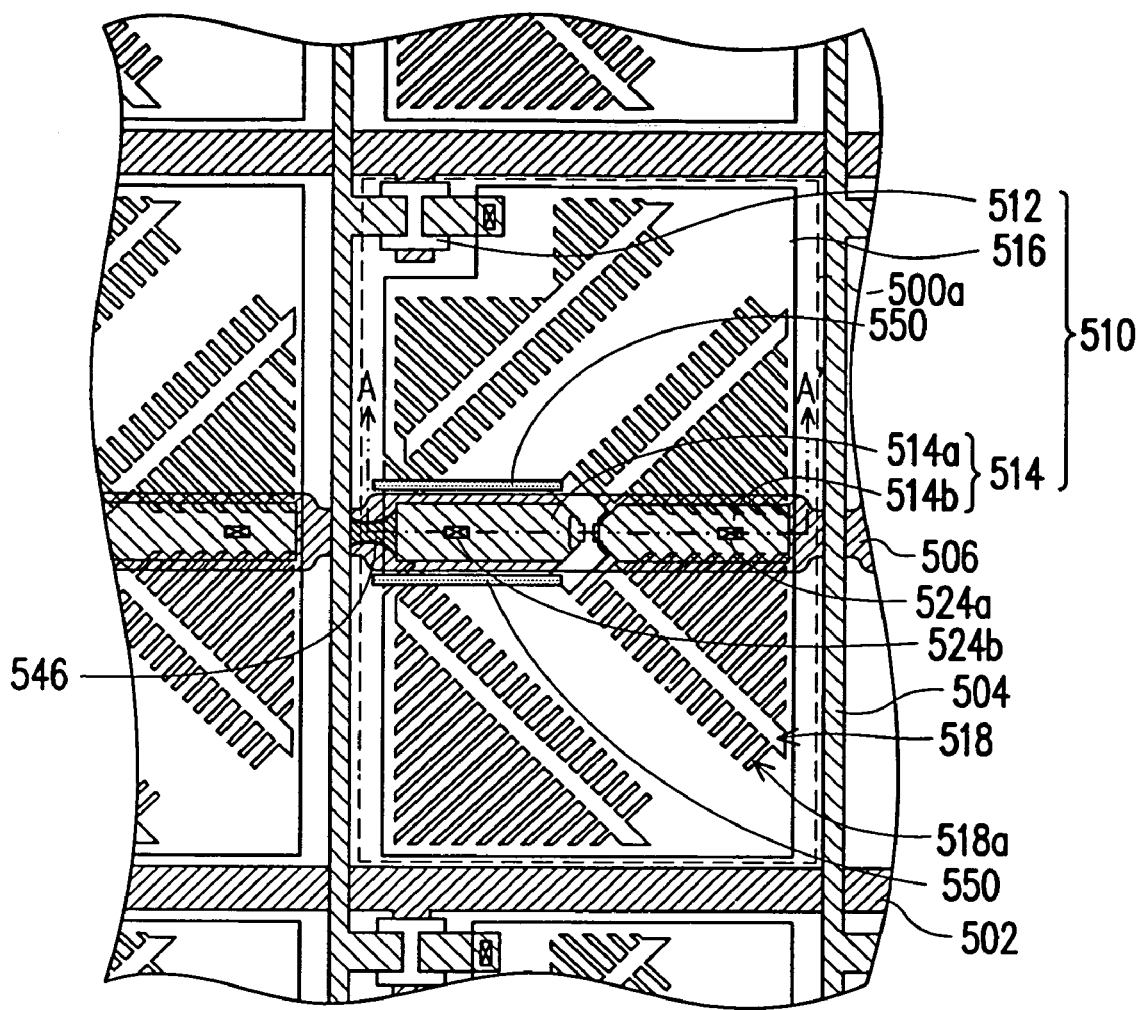
FIG. 8A is a top view of defective capacitor caused by the material residue between upper electrode and neighboring data line and show how to repair.
Figure 8B:
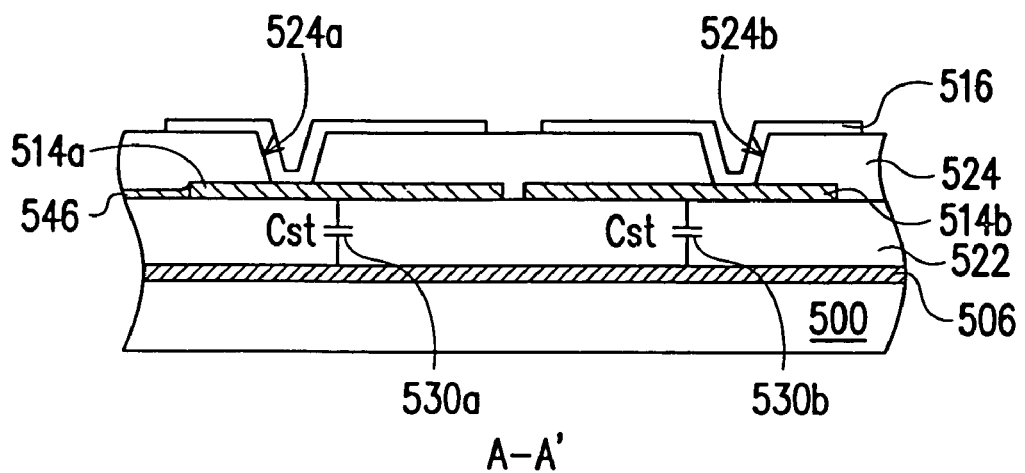
FIG. 8B is a cross sectional view of the structure of FIG. 8A taken along A-A'.

FIG. 8A is a top view of a portion of a thin film transistor array substrate with a defective capacitor. FIG. 8B is a cross sectional view of the structure of FIG. 8A along A-A'. Referring to FIGS. 8A and 8B, a conductive residue 546 exists, for example, between one of the first upper electrode 514a and the neighboring data line 504. Wherein, material residue causes the short between the first upper electrode 514a and neighboring data line 504. The various voltage waveform of data line can affect operation of pixel through the short and cause abnormal display. Generally, the conductive residue 546 is residual conductive material when an etching or other process has not completely removed conductive material while fabricating the upper electrodes 514 and the data lines 504.

Referring to FIGS. 8A and 8B, to solve the above described problem, the repairing method may use laser to remove the portion of the corresponding pixel electrode 516, such as the removed area 550, at the peripheral area of the first capacitor 530a. By the slit 518 over the corresponding pixel electrode 516 and the removed area 550, the portion of the corresponding pixel electrode 516 corresponding to the first upper electrode 514a is electrically isolated from the other portion of the corresponding pixel electrode 516. The various voltage waveform of data line can't affect the operation of second capacitor 530b through first capacitor 530a. Accordingly, the second capacitor 530b and the other portion of the corresponding pixel electrode 516 can normally operate.

Figure 9A:
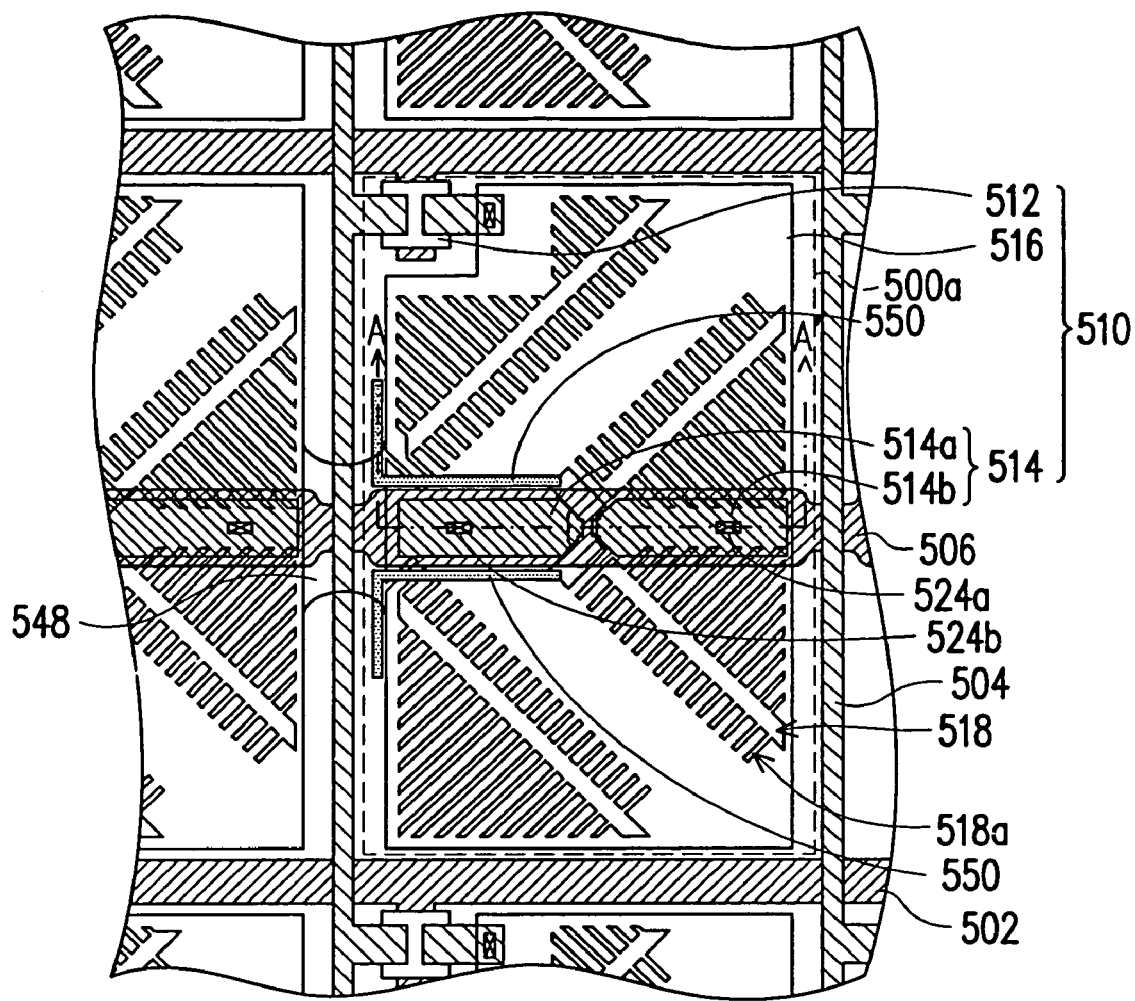
FIG. 9A is a top view of defective capacitor caused by the material residue between pixel electrode and neighboring pixel electrode and show how to repair.
Figure 9B:
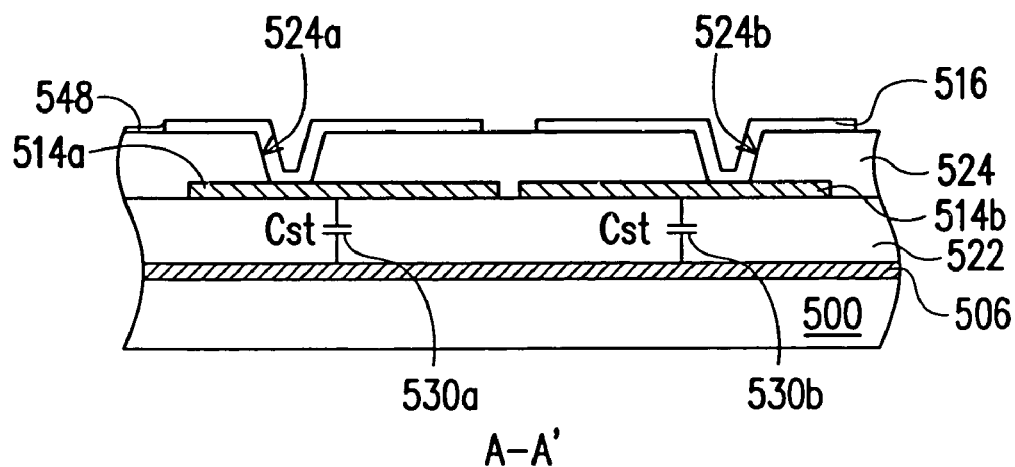
FIG. 9B is a cross sectional view of the structure of FIG. 8A taken along A-A'.

FIG. 9A is a top view of a portion of a thin film transistor array substrate with a defective capacitor. FIG. 9B is a cross sectional view of the structure of FIG. 8A along A-A'. Referring to FIGS. 9A and 9B, a conductive residue 548 exists, for example, between the corresponding pixel electrodes 516 of two neighboring pixel electrode units 510. The corresponding pixel electrodes 516 are electrically shorted to each other through the conductive residue 548. Generally, the method of forming the pixel electrodes 516, for example, forms a transparent conductive film layer (not shown) over the substrate 500 by a sputtering process or a co-evaporation process first. Then, a photolithographic and an etching process are performed to the transparent conductive layer (not shown) to obtain the patterned pixel electrodes 516. If the etching process has not completely removed the transparent conductive material while patterning the transparent conductive material, the above mentioned conductive residue 548 may be generated.

Referring to FIGS. 9A and 9B, in the repairing method of the present invention, the first capacitor 530a is deemed as a defective capacitor. The portion of the pixel electrode 516 at the peripheral area of the first capacitor 530a is removed by laser. Wherein, the removed area 550 can reach the conductive residue 548 between the corresponding data line 504 and the pixel electrode 516 so that the other portion of the pixel electrode 516 of the pixel unit 510 is electrically isolated from the pixel electrodes 516 of the neighboring pixel units 510, and the pixel electrode 516 over the defective capacitor, i.e., the first capacitor 530a. Accordingly, the second capacitor 530b and the other portion of the pixel electrode 516 can normally operate.

The thin film transistor array substrate and the method for repairing the same according to the present invention can be applied to a MVA LCD. Wherein, by incorporating the original slit of the pixel electrode and the removed area of the pixel electrode, the portion of the pixel electrode corresponding to the defective capacitor can be accurately and electrically isolated from the other portion of the pixel electrode so that the pixel unit can normally operate. Of course, the applications of the thin film transistor array substrate and the method for repairing the same according to the present invention are not limited to the MVA LCD. In other embodiments of the present invention, the present invention can also be applied to twisted nematic (TN) LCDs, or super twisted nematic (STN) LCDs. Even a pixel electrode of the thin film transistor array substrate does not have slits, the repairing method of the present invention can still achieve the purpose of isolating defective capacitors by modifying the fusing route thereof.

Note that the embodiments and figures described above are examples of the present invention. Locations and amounts of the defects or residues may vary with different processes. Besides, the reasons of causing defective capacitors should not be limited to the described defects or residues. In addition, though the embodiments described in the present invention contain two capacitors in each pixel unit, the scope of the present invention should not be limited thereto. One of ordinary skill in the art, without departing from the spirit of the invention, can modify the amount, the shape, and the location of the upper electrodes to form different types of capacitors in a pixel unit according to different processes and design requirements.

Accordingly, the thin film transistor array substrate and the method for repairing the same according to the present invention at least have the following features and advantages:

(1) Each pixel unit comprises plural capacitors. If one of the capacitors fails, the repairing method of the present invention can isolate the defective capacitor from other capacitors. The pixel unit thus can normally display and the manufacturing yields are also increased.

(2) When used in the MVA LCD, the present invention can incorporate the original slit of the pixel electrode with the repairing method. The repaired area is thus reduced and the labor hours are decreased accordingly.

(3) By incorporating the original slit and the repairing method, the repairing method does not touch the pixel electrode over the metal layer, such as the common line or the upper electrode. The damage to the metal layer can be avoided and the repairing effect can be improved.

(4) The upper electrode in the pixel unit, the data line, and the source/drain regions of the thin film transistor can be formed in the same process. Therefore, no additional process is required, nor an increase of the manufacturing cost will be incurred.

Although the present invention has been described in terms of exemplary embodiments, it is not limited thereto. Rather, the appended claims should be constructed broadly to include other variants and embodiments of the invention, which may be made by those skilled in the field of this art without departing from the scope and range of equivalents of the invention.

What is claimed is:

1. A thin film transistor array substrate, comprising:
   a substrate;
   a plurality of scan lines disposed over the substrate;
   a plurality of data lines disposed over the substrate, wherein the data lines and the scan lines form a plurality of pixel areas on the substrate;
   a plurality of common lines disposed over the substrate, wherein a portion of each common line is disposed in one of the pixel areas; and
   a plurality of pixel units disposed over the substrate, wherein each of the pixel units is disposed in one of the pixel areas and driven by one of the scan lines and one of the data lines corresponding thereto, and each of the pixel units comprises:
      a thin film transistor coupled to the scan line and the data line corresponding thereto;
      a patterned pixel electrode disposed over the common line corresponding thereto and coupled to the thin film transistor, wherein the pixel electrode has at least one slit; and
      a plurality of upper electrodes disposed between the pixel electrode and the common line corresponding thereto, a portion of at least one slit is across the common line corresponding thereto and across an area located between the upper electrodes, wherein the portion of the at least one slit is across two opposite sides of the area aligned with two opposite sides of each of the upper electrodes respectively, and is substantially not overlapped with the upper electrodes, each of the upper electrodes is coupled to the pixel electrode and forms a plurality of capacitors with the common line corresponding thereto, and if at least one of the capacitors is defective, a portion of the pixel electrode corresponding to the defective capacitor is electrically isolated from the other portion of the pixel electrode.

2. The thin film transistor array substrate of claim 1, wherein a particle and/or a hole exists between the upper electrode of the defective capacitor and the common line corresponding thereto.

3. The thin film transistor array substrate of claim 1, wherein a particle and/or a hole exists between the pixel electrode of the defective capacitor and the common line corresponding thereto.

4. The thin film transistor array substrate of claim 1, further comprising a conductive residue coupled between the upper electrode of the defective capacitor and one of neighboring data lines.

5. The thin film transistor array substrate of claim 4, wherein the upper electrode, the data lines and the conductive residue have the same material.

6. The thin film transistor array substrate of claim 5, wherein the material of the conductive residue comprises aluminum.

7. The thin film transistor array substrate of claim 1, further comprising a conductive residue coupled between the pixel electrode corresponding to the defective capacitor and one of neighboring pixel electrodes.

8. The thin film transistor array substrate of claim 7, wherein the material of the conductive residue comprises indium-tin-oxide (ITO).

9. The thin film transistor array substrate of claim 1, wherein the edge of each slit has a jag profile.

10. The thin film transistor array substrate of claim 1, wherein each of the pixel units further comprises a plurality of contact holes, and each of the upper electrodes is coupled to the corresponding one pixel electrode through the corresponding one contact hole.

11. A thin film transistor array substrate, comprising:
a substrate;
a plurality of scan lines disposed over the substrate;
a plurality of data lines disposed over the substrate, wherein the data lines and the scan lines form a plurality of pixel areas on the substrate;
a plurality of common lines disposed over the substrate, wherein a portion of each common line is disposed in one of the pixel areas; and
a plurality of pixel units disposed over the substrate, wherein each of the pixel units is disposed in one of the pixel areas and driven by one of the scan lines and one of the data lines corresponding thereto, wherein each of the pixel units comprises:
a thin film transistor coupled to the scan line and the data line corresponding thereto;
a patterned pixel electrode disposed over the common line corresponding thereto and coupled to the thin film transistor, wherein the pixel electrode has at least one slit to tilt liquid crystal molecules; and
a plurality of upper electrodes disposed between the pixel electrode and the common line corresponding thereto, a portion of at least one slit to tilt the liquid crystal molecules is across the common line corresponding thereto and across an area located between the upper electrodes, wherein the portion of the at least one slit is across two opposite sides of the area aligned with two opposite sides of each of the upper electrodes respectively, each of the upper electrodes is coupled to the pixel electrode, and forms a plurality of capacitors with the common line corresponding thereto.

12. A thin film transistor array substrate, comprising:
a substrate;
a plurality of scan lines disposed over the substrate;
a plurality of data lines disposed over the substrate, wherein the data lines and the scan lines form a plurality of pixel areas on the substrate;
a plurality of common lines disposed over the substrate, wherein a portion of each common line is disposed in one of the pixel areas; and
a plurality of pixel units disposed over the substrate, wherein each of the pixel units is disposed in one of the pixel areas and driven by one of the scan lines and one of the data lines corresponding thereto, wherein each of the pixel units comprises:
a thin film transistor coupled to the scan line and the data line corresponding thereto;
a patterned pixel electrode disposed over the common line corresponding thereto and coupled to the thin film transistor, wherein the pixel electrode has at least one slit; and
a plurality of upper electrodes disposed between the pixel electrode and the common line corresponding thereto, a portion of at least one slit is across the common line corresponding thereto and across an area located between the upper electrodes, wherein the portion of the at least one slit is across two opposite sides of the area aligned with two opposite sides of each of the upper electrodes respectively, and each of the upper electrodes is coupled to the pixel electrode and forms a plurality of capacitors with the common line corresponding thereto.

13. The thin film transistor array substrate of claim 12, wherein the edge of each slit has a jag profile.

14. The thin film transistor array substrate of claim 12, wherein each of the pixel units further comprises a plurality of contact holes, and each of the upper electrodes is coupled to the corresponding one pixel electrode through the corresponding one contact hole.

15. A repairing method for a thin film transistor array, adapted to repair the thin film transistor array of claim 12, wherein the thin film transistor array comprises a defective capacitor, the repairing method comprising:
removing the portion of the pixel electrode corresponding to the defective capacitor so that the portion of the pixel electrode corresponding to the defective capacitor is electrically isolated from the other portion of the pixel electrode.

16. The repairing method for a thin film transistor array of claim 15, wherein the portion of the pixel electrode is removed by laser.

* * * * *